(No Model.)
J. T. BOYD.
SCRAPER.
No. 333,990. Patented Jan. 12, 1886.
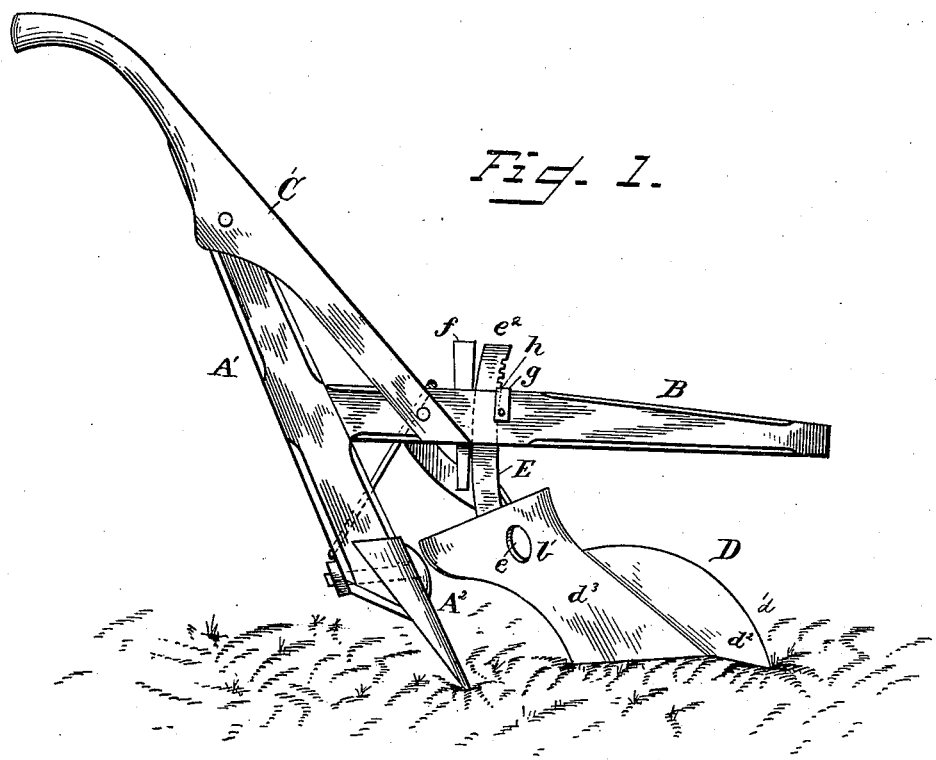
Fig. 1.
Fig. 2.
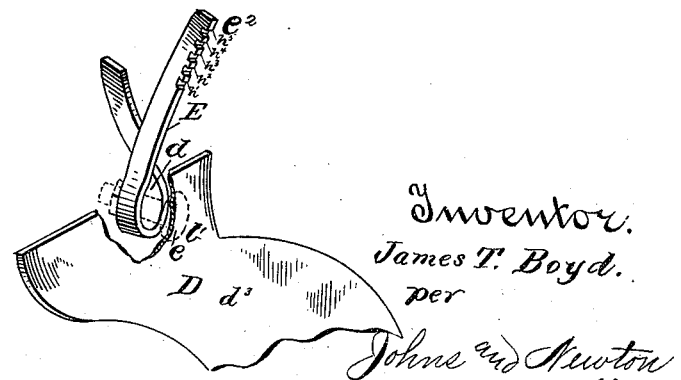
Witnesses:
J. Thomson Cross
M. D. Peek
Inventor:
James T. Boyd.
per
Johns and Newton
attys.

UNITED STATES PATENT OFFICE.

JAMES T. BOYD, OF COOPER, MISSISSIPPI.

SCRAPER.

SPECIFICATION forming part of Letters Patent No. 333,990, dated January 12, 1886.

Application filed September 28, 1885. Serial No. 178,442. (No model.)

*To all whom it may concern:*

Be it known that I, JAMES T. BOYD, a citizen of the United States, residing at Cooper, in the county of Monroe and State of Mississippi, have invented a new and useful Improvement in Scrapers, of which the following is a specification.

My invention relates to scrapers used in the cultivation of cotton, but is adapted to the cultivation of corn, peas, potatoes, or any crop that is cultivated with the plow; and the object of my invention is, first, to provide a scraper which shall be used in combination with any plow, and, secondly, which shall effect, as will be hereinafter more specifically shown, a material saving of labor in the cultivation of cotton, and which will produce the results of greater nicety and uniformity in the condition of the area of land cultivated. I attain these results by the mechanism illustrated in the accompanying drawings, in which—

Figure 1 represents my adjustable scraper in operation in combination with an ordinary turning-plow, the scraper having been previously adjusted at a proper angle with the ground surface to be plowed. Fig. 2 is a bottom plan view of the beam of plow, showing mortise for insertion of metal standard, and giving isolated view of the standard with scraper attached in the slot of same.

Similar letters refer to similar parts through the several views.

$A'$, B, $C'$, and $A^2$ constitute, respectively, the stock, the beam, the handles, and the shovel of plow used in combination with scraper. The scraper D having been rigidly attached in the slot $d$ of the metal standard E by means of the screw-bolt $e$, the adjustable prong $e^2$ of the standard E is permanently fixed in the mortise $b^2$ of the plow-beam B, and is rigidly fixed in the same by means of the wedge $f$ and by engaging with the metal bracelet $g$ at notch $h$.

The method of adjusting the scraper D with reference to the ground surface and the plow-shovel $A^2$ consists of moving the wedge $f$ and the adjustable prong $e^2$ of standard E up or down in the mortise $b^2$ of the plow-beam B, or in properly adjusting the nut $e'$ on the bolt $e$, which rests in the slot $d$ of metal standard E.

My combination adjustable scraper being in operation, as shown in Fig. 1 of drawings, it is my design that it shall run on both sides of the row containing the plants. The scraper D removes the dirt from the plants, and, being, by reason of its conformation and shape, adaptable to the diversified surface of the ground, combines the advantages of a surface and a hilling scraper. It clears away from the hill, as well as from the level surface, grass and all foreign substances, and is followed by the plow-shovel $A^2$, which raps up the middle and throws the dirt thus cleared to the plant.

I am aware that prior to my invention cotton-scrapers have been made having severally edges which strike the ground at right angles from the surface broken by the plow to which they are attached, and which meet with unnecessary resistance from the ground surface by the rectangular shape of their edges, and that patents were granted, respectively, to T. H. Trautham, April 4, 1871, No. 113,367, and to I. R. Newton, October 10, 1876, No. 183,199, for adjustable cotton-scrapers, and that patent was granted to T. J. Lee, November 30, 1875, No. 170,632, for a device containing in two different sections a surface and a hilling scraper. I therefore do not claim any of the several features of said inventions; but What I do claim, and desire to secure by Letters Patent, is—

1. A cotton-scraper having the curved point $d'$, terminating at its forward extremity in a plunging point, $d^2$, extending below the plane of the lower edge of a mold-board, $d^3$, having a broad cutting-edge next to the ground, and with a flanged upper part describing a curve upon the off side of plow, in combination with an adjustable notched standard secured thereto and adapted to be secured to the beam in front of a plow or shovel, as set forth.

2. In an adjustable cotton-scraper, the combination of the curved point $d'$, the plunging point $d^2$, and the mold-board $d^3$, all substantially as shown, and for the purposes specified.

JAMES T. BOYD.

Witnesses:
D. W. HOUSTON,
B. H. GILLESPIE.